No. 664,280. Patented Dec. 18, 1900.
E. A. LELAND.
FILTER.
(Application filed Sept. 12, 1899.)

(No Model.)

Witnesses
Inventor
Edwin A. Leland
By his Attorney
James A. Whitney

THE NORRIS PETERS CO., PHOTO-LITHO., WASHINGTON, D. C.

UNITED STATES PATENT OFFICE.

EDWIN A. LELAND, OF GREAT BARRINGTON, MASSACHUSETTS, ASSIGNOR TO THE LELAND FILTER COMPANY, OF MASSACHUSETTS.

FILTER.

SPECIFICATION forming part of Letters Patent No. 664,280, dated December 18, 1900.

Application filed September 12, 1899. Serial No. 730,236. (No model.)

*To all whom it may concern:*

Be it known that I, EDWIN A. LELAND, a citizen of the United States, residing in Great Barrington, in the county of Berkshire and State of Massachusetts, have invented certain new and useful Improvements in Filters; and I do hereby declare that the following is a full, clear, and exact description of the same, reference being had to the accompanying drawings, making a part of this specification, in which—

Figure 1:
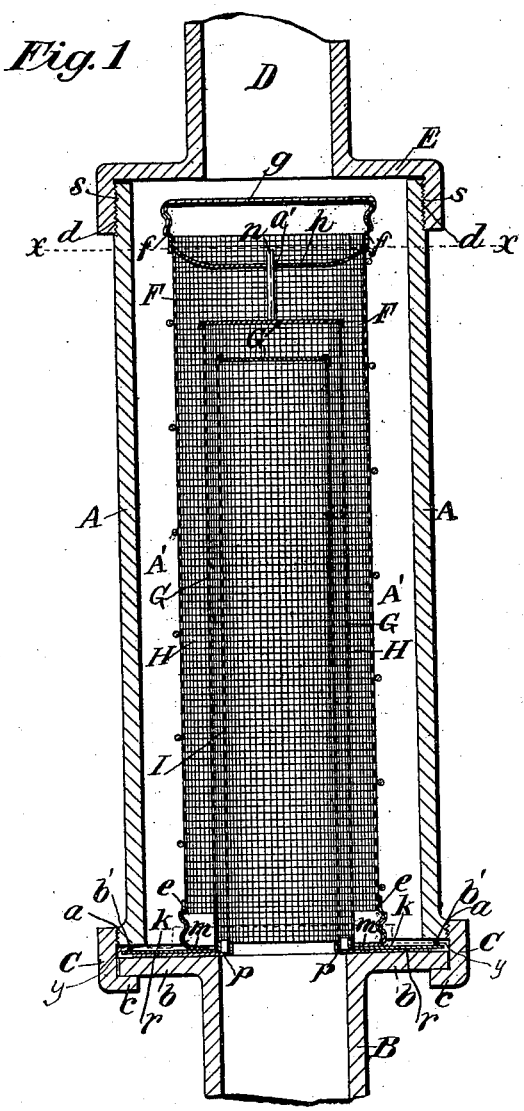
Figure 2:
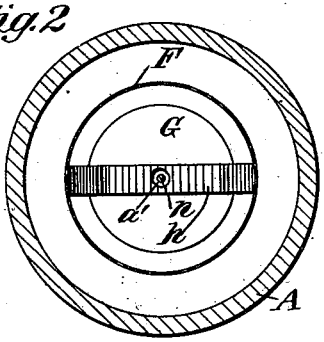
Figure 3:
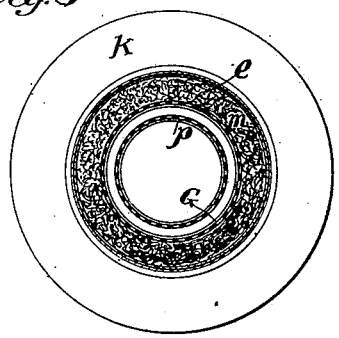

Figure 1 is a central vertical sectional view of an apparatus made according to my invention. Fig. 2 is a horizontal sectional view of the same, taken in the line $xx$ of Fig. 1. Fig. 3 is a like view of one part of the said apparatus, taken in the line $yy$ of Fig. 1.

This invention relates to that variety of filters in which the liquid to be filtered passes within a tubular filter and thence through the walls of the filter to the outlet; and the object of the invention is to remedy certain defects and inconveniences disclosed by experience as heretofore existent in filtering apparatus of the class indicated.

To this end the invention comprises certain novel combinations of parts hereinafter fully set forth and particularized.

A is the barrel or shell of the filter. At its bottom this shell is detachably connected with the inlet-pipe B, through and from which the liquid to be filtered is passed to the apparatus. The means of attaching the inlet-pipe B to the shell A may be of any preferred character. As shown in the drawings, the lower extremity of the shell has an annular rib $a$, which is circumferentially screw-threaded, and the inlet-pipe has at its adjacent end a circumferential flange $b$. A nut C, which has an inwardly-projecting flange $c$, is screwed upon the rib $a$, with the flange $c$ of the nut holding against the flange $b$ of the inlet-pipe, thus retaining the parts in due relation with each other in Fig. 1. At its upper end the shell A connects with an outlet-pipe D in any suitable manner. As shown in the drawings, the outlet-pipe extends from a cap E, which is screwed upon the end of the shell, as shown at $d$. It is of course to be understood that the shell is preferably cylindrical in its cross-section.

F is a foraminated cylinder, which is of less diameter than the interior of the shell A, so that a space A' is afforded between the said cylinder F and the inner wall of the shell, as shown in Fig. 1. The cylinder F has at its lower end a screw-threaded annulus $e$ and at its upper end a similarly-threaded annulus $f$. Upon the latter is screwed a top $g$, which closes the upper end of the cylinder F. The latter near its upper end has internally a cross-bar $h$, in which in substantially the axial line of the cylinder is an opening $a'$, the purpose of which will presently herein appear.

G is a smaller foraminated cylinder, the size and proportions of which are such that when in position within the cylinder F a space of substantial proportions is afforded between the two cylinders, as shown more fully at H in Fig. 1. In this space is placed the filtering material, which may be of any suitable kind—as, for example, quartz, sand, or the like. Fast upon the lower end of the smaller cylinder G is an annular plate or flat circumferential flange $k$, and fast upon the upper side of this flange $k$ and concentric with the adjacent walls of the cylinder G is a screw-threaded annulus $m$, the screw-thread of which corresponds in pitch and character to that of the annulus $e$ on the lower end of the cylinder F. The flange K of the cylinder G extends circumferentially beyond the circumference of the threaded annulus $m$, as more clearly shown in Fig. 3. Fast upon the upper end of the cylinder G in the axial line of the latter is a guiding-stem $n$. It will be observed that the cylinder G and its flange $k$ and also its screw-threaded annulus $m$ being fast one to another the whole moves together as a single device in the operation of replacing or removing the said cylinder in or from, as the case may be, the other parts of the apparatus.

I is a third cylinder also foraminated and of such size and proportions that it may be thrust into the cylinder G with its walls close to the walls of the cylinder G. At the lower end of this third cylinder I is a flat circumferential flange $r$, arranged to lie under the flange $k$ of the cylinder G, so that the same devices which retain the lower end of the latter in position will also serve a like purpose with regard to the third cylinder I.

To most conveniently assemble the parts, the screw-threaded annulus of the cylinder G is thrust into the cylinder F, its stem $n$ passing through the opening $a'$ in the cross-piece $h$ of the latter and in its inward movement serving to guide the adjacent end of the cylinder G into a position concentric with the surrounding part of the cylinder F and also to retain it in such position. The screw-threaded annulus $m$ of the cylinder G is then screwed into the correspondingly-threaded annulus $e$ of the cylinder F, thereby uniting the two cylinders, so that they may be handled together and also that they securely retain their fixed relation with regard to each other when the parts of the apparatus are in position for use. During the combined axial and longitudinal movement of the cylinder G, while being thus secured to the cylinder F, it is kept in its proper axial relation to the cylinder F by means of the stem $n$, which permits the longitudinal movement, while steadying the cylinder G, with its axis coincident, or practically so, with that of the cylinder F. The third cylinder I is thrust longitudinally into the cylinder G, with its flange $r$ below the flange $k$ of the cylinder G, and the two flanges thus superposed are brought with their edges into such a position that they are clamped between the lower end of the shell A and the flange $b$ of the inlet-pipe B, when the latter is secured to the shell by the screw-coupling, as herein previously set forth. When desired, one or more packing-rings $c'$ may be used to tighten the joints between the parts just mentioned.

In the operation of the apparatus the liquid to be filtered passes from the inlet-pipe B into the innermost or third cylinder I, thence through the cylinder G, the filtering material in the space H, and the outer cylinder F into the space $A'$ between the latter and the walls of the shell A, and thence to the outlet-pipe D, the cylinder I serving as a strainer to retain the grosser impurities from contact with the cylinder G.

It will be observed that by simply detaching the shell A from the inlet-pipe B to open the end of the shell the three cylinders with the filling may be removed bodily and together, that by then unscrewing the cylinder G from the cylinder F access may be had to the outside of the cylinder G and the inside of the cylinder F, that by simply withdrawing the third or innermost cylinder I access is afforded to the inner surface of the cylinder G, while the cylinder I being thus separated has both its inner and outer surfaces made accessible. By this means the entire working surfaces of the cylinders may be readily cleaned by the use of brushes or other rubbing or abrasive agencies, which in this class of filters have heretofore been capable of use, if at all, only under conditions of great inconvenience and imperfect efficiency.

By means of the detachable screw-cap $g$ not only may the filtering material be conveniently supplied to or empted from the space H without detaching the cylinders F and G from each other, but by circumferentially bracing the top of the cylinder F contributes very materially to its stability and permanence. It will be observed that while I have shown the apparatus as used in a vertical position it may when desired be used in a horizontal or inclined position without in any manner departing from my invention; also, that while I have referred to certain parts as "cylinders" said parts may, as equivalent constructions, be made of other than cylindric cross-section without departing from my invention.

What I claim as my invention is—

1. In a filter the combination with a barrel or shell and a foraminated cylinder placed in said shell with a space between the cylinder and the shell and having a screw-threaded annulus at its inlet end, of an inner foraminated cylinder proportioned to afford a space between the two cylinders and having fast to its inlet end an annulus threaded to screw into the annulus of the larger cylinder and a circumferentially-extended flange projected beyond the annulus to engage between the end of the shell and an attached inlet-pipe; substantially as herein set forth.

2. In a filter, the combination with a barrel or shell, of a foraminated cylinder which has a screw-threaded annulus at the inlet end of the filter, and a cross-piece at its opposite end with an opening in said cross-piece in the axial line of the cylinder, of a foraminated inner cylinder proportioned to afford a space between itself and the outer cylinder and having fast at one of its ends a threaded annulus which screws into the annulus of the outer cylinder and at the other has a guiding-stem arranged to pass through the opening of the cross-piece when the parts are united; substantially as herein set forth.

3. In a filter, the combination with a barrel or shell, of a foraminated cylinder which has a screw-threaded annulus at the inlet end of the filter and a detachable cap and a cross-piece at its uppermost end, said cross-piece having an opening in the axial line of the cylinder, of a foraminated inner cylinder proportioned to afford a space between itself and the outer cylinder and having at one end a threaded annulus which screws on the annulus of the outer cylinder and a flange which extends beyond the circumference of its said annulus and abuts against the end of the shell, a guiding-stem fast on the opposite end of the inner cylinder and arranged to pass through the opening in the cross-piece of the outer cylinder, and devices for clamping the flange between the end of the shell and the inlet-pipe through which the liquid to be filtered is supplied to the apparatus; substantially as herein set forth.

4. In a filter, the combination with a barrel or shell of a foraminated cylinder which has a screw-threaded annulus at the inlet end of the filter and a detachable cap and a cross-piece having an opening in the axial line of the cylinder, of a foraminated inner cylinder proportioned to afford a space between itself and the outer cylinder and having at one end a threaded annulus which screws on the annulus of the outer cylinder and a flange which extends beyond the circumference of its said annulus and abuts against the end of the shell, a guiding-stem fast upon the opposite end of the inner cylinder and arranged to pass through the opening in the cross-piece of the outer cylinder, a third foraminated cylinder inserted within the aforesaid inner cylinder close to the walls thereof and having a circumferential flange which lies below the flange of the said inner cylinder and a screw-coupling for holding the said two flanges together between the end of the shell and the inlet-pipe of the apparatus, substantially as herein set forth.

EDWIN A. LELAND.

Witnesses:
CHARLES J. BURGET,
WALTER B. SANFORD.